(12) United States Patent
Jays et al.

(10) Patent No.: US 8,474,375 B2
(45) Date of Patent: Jul. 2, 2013

(54) JUICER ARRANGEMENT

(75) Inventors: Nick Jays, Rustington (GB); Adam Wade, Southsea (GB)

(73) Assignee: Kenwood Limited, Hampshire (GB)

( * ) Notice: Subject to any disclaimer, the term of this patent is extended or adjusted under 35 U.S.C. 154(b) by 0 days.

(21) Appl. No.: 13/318,628

(22) PCT Filed: Apr. 27, 2010

(86) PCT No.: PCT/GB2010/000827
§ 371 (c)(1),
(2), (4) Date: Dec. 28, 2011

(87) PCT Pub. No.: WO2010/128274
PCT Pub. Date: Nov. 11, 2010

(65) Prior Publication Data
US 2012/0111208 A1 May 10, 2012

(30) Foreign Application Priority Data
May 5, 2009 (GB) .................................. 0907581.3

(51) Int. Cl.
*A47J 19/02* (2006.01)
(52) U.S. Cl.
USPC ................. 100/104; 99/510; 99/511; 99/513; 100/108; 100/110; 100/126; 100/135; 222/571; 222/572; 222/566; 222/567
(58) Field of Classification Search
USPC .................... 99/510, 511, 513; 100/104, 108, 100/110, 126, 134, 135, 213; 222/571, 572, 222/566–567
See application file for complete search history.

(56) References Cited

U.S. PATENT DOCUMENTS 2,185,651 A * 1/1940 Sollie .......................... 73/864.64
2,380,338 A * 7/1945 Sherman ........................ 401/78

(Continued)

FOREIGN PATENT DOCUMENTS

| EP | 1834555 A1 | 9/2007 |
| WO | 2005002404 A1 | 1/2005 |

(Continued)

OTHER PUBLICATIONS

International Search Report mailed Oct. 6, 2010 for PCT/GB2010/000827 filed Apr. 27, 2010.

(Continued)

*Primary Examiner* — Dana Ross
*Assistant Examiner* — Onekki Jolly
(74) *Attorney, Agent, or Firm* — Marty Fleit; Paul D. Bianco; Fleit Gibbons Gutman Bongini Bianco PL

(57) ABSTRACT

A juicer arrangement comprises a motor-driven appliance (1), capable of extracting juice from fruit, and a vessel (10) for receiving the juice. The appliance has a tubular outlet duct (9) through which juice can flow; the duct consisting of an inner portion (12) that is fixed to the appliance (1) and an outer portion (13) which can be rotated, relative to the inner portion (12), about the longitudinal axis (12a) of the tubular outlet duct (9). Near the outlet end of the outer portion (13) of the outlet duct there is provided a chordally-extending internal wall (15), configured such that, in one rotational position of the outer portion (13) of the duct relative to the inner portion (12), the wall (15) is positioned to act as an anti-dripping dam member to resist liquid flow through the outlet duct (9). In another rotational position of the outer portion (13) of the duct relative to the inner portion (12), the wall (15) is inverted, leaving a gap through which juice can be dispensed. Preferably, the vessel (10) has a lid (27) pre-formed with an aperture (28) into which the outer portion (13) of the duct (9) can be inserted, and the outer portion (13) can be rotated relative to the inner portion (12) of the duct (9) whilst remaining inserted in the aperture (28).

20 Claims, 5 Drawing Sheets

U.S. PATENT DOCUMENTS

| | | | | |
|---|---|---|---|---|
| 3,100,588 | A * | 8/1963 | Pearson, Jr. | 222/156 |
| 4,647,240 | A * | 3/1987 | Ladd et al. | 401/123 |
| 4,671,690 | A * | 6/1987 | Ladd et al. | 401/123 |
| 6,457,891 | B1 * | 10/2002 | Bredacts | 401/123 |
| 6,678,918 | B2 * | 1/2004 | Nakabayashi | 16/82 |
| 6,932,533 | B1 * | 8/2005 | Chen | 401/281 |
| 7,644,656 | B2 | 1/2010 | Esteve | |
| 2006/0060091 | A1 * | 3/2006 | Chang | 99/511 |
| 2007/0056450 | A1 * | 3/2007 | Hensel | 99/495 |
| 2007/0209528 | A1 | 9/2007 | Chang | |
| 2007/0261571 | A1 * | 11/2007 | Esteve | 99/504 |

FOREIGN PATENT DOCUMENTS

| | | | |
|---|---|---|---|
| WO | 2009/010897 | * | 1/2009 |
| WO | 2009010897 | A2 | 1/2009 |

OTHER PUBLICATIONS

Written Opinion of the International Searching Authority mailed Oct. 6, 2010 for PCT/GB2010/000827 filed Apr. 27, 2010.

British Search Report dated Aug. 18, 2009 for Application No. GB0907581.3 filed May 5, 2009.

\* cited by examiner

JUICER ARRANGEMENT

This invention relates to juicer arrangements, and more particularly (though not exclusively) to centrifugal juicers intended for use in domestic kitchens and comprising motor-driven appliances capable of extracting the juice from fruits, typically citrus fruits, or vegetables, and delivering the juice into a vessel, such as a jug or carafe, that is removably positioned, adjacent the main body of the appliance, to receive the juice by way of an outlet duct.

Typically, such juicers incorporate a macerating device, such as a discoidal cutter plate, which is rotated at a reasonably high speed to pulp the fruits or vegetables being juiced; the cutter plate comprising, or at least being located near, the base of a frusto-conical filter member which is disposed in a generally cylindrical working space. The frusto-conical side wall of the filter member is pierced or otherwise formed with small holes and/or narrow slits, thus being sufficiently porous to permit juice to pass therethrough. The cutter plate, and usually also the filter member, are spun sufficiently rapidly to separate the juice from pulp residues, comprising mainly fibrous bulk matter; the juice passing through the apertures in the frusto-conical wall for collection and dispensing and the pulp residues being blocked by the filter member and generally thrown upwardly and outwardly therefrom.

The working space is capped by a lid, through the top of which passes a feed-chute designed to accommodate produce to be juiced, and a pusher is provided whereby the produce can be urged through the feed-chute and into abrasive contact with the cutter plate.

Appliances based upon the foregoing general arrangement are well established, can be economically manufactured and work quite well, though it is generally found necessary to collect, either within the appliance or in a separate (or separable) receptacle, unwanted materials such as pulp residues, partly because the presence of undue amounts of such materials in the prepared juice is considered unpalatable by many users and partly because such materials tend to block outlet ducts, which thus require frequent cleaning. One particularly efficient technique for diverting pulp residues into a separable container for collection and disposal is described in our co-pending UK patent application No. GB 0900851.7, and that technique may conveniently be used in conjunction with the present invention.

Further difficulties arise however in certain respects, such as resisting a tendency for the juice to continue dripping from the outlet duct after a desired amount of juice has been dispensed, and ensuring that the juice flows cleanly (i.e. without undue splashing) into the vessel used to receive it. These difficulties are particularly (though not exclusively) associated with centrifugal juicers, from which the juice can be expelled at quite rapid rates.

It is an object of this invention to provide a juicing arrangement in which at least one of the above-mentioned difficulties is reduced or overcome.

According to the invention there is provided a juicer arrangement comprising a motor-driven appliance capable of extracting juice from fruit and a vessel for receiving the juice; the appliance having an outlet duct for the juice; said duct being tubular about an axis running there-along; the vessel having a lid or cover means pre-formed with an aperture dimensioned and configured to receive said tubular outlet duct, and the duct having an end portion with an internal wall extending chordally there-across; wherein at least said end portion is rotatable about the axis of the duct to invert said wall for juice dispensing and to otherwise position said wall as an anti-dripping dam member to resist liquid flow.

By this means, the end portion of the outlet duct can be rotated from a juice-dispensing position to a drip-stopping position, and moreover the end portion of the duct inserts at least part way into the aperture in said lid or cover, thereby assisting the clean delivery of juice into the vessel.

Preferably the end portion of the duct is formed with a member that can be grasped, pressed or otherwise manipulated by a user to facilitate rotation of the end portion of the duct from one or its positions to the other.

It is further preferred that the end portion can be rotated between its juice-delivery and drip-stop positions whilst remaining inserted into the aperture in said lid or cover means of said vessel.

In preferred embodiments, a liquid seal configured to accommodate the rotation of said end portion of the duct relative to the remainder portion of the duct, is provided between an external surface of the remainder portion and an internal surface of the end portion.

It is further preferred that the outlet duct comprises a fixed, substantially straight and hollow tube and said end portion comprises an outer collar that can rotate through at least a predetermined angle relative to the tube.

The hollow tube and the end portion are preferably formed with co-operative components limiting and defining the angle through which the end portion of the duct may rotate relative to the fixed remainder portion.

It is further preferred that end stops are provided for the angular movement of the end portion, whereby a user is provided with tactile confirmation that the end portion is properly located in one or other of its extreme angular positions relative to the fixed remainder portion of the outlet tube, either for dispensing or to resist dripping.

In further preferred embodiments of the invention, the hollow tube and the end portion are formed with co-operative components permitting their axial assembly and disassembly so that the end portion is readily removable for cleaning.

Preferably, the axis of the tubular outlet duct is angled downwards from the appliance.

It is also preferred that the aperture in the lid or cover means of the juice-receiving vessel comprises an aperture dimensioned to snugly receive part at least of the end portion of the outlet duct. This facilitates clean delivery of juice into the vessel, with minimal splashing.

Preferably too, the vessel and the appliance are designed to present complementary or contrasting appearances, and they may conveniently be shaped so as to interfit with one another. By this means, the design of the two components can be presented as an entity, whereby the use of non-matching vessels with the appliance is discouraged.

In order that the invention may be clearly understood and readily carried into effect, one embodiment thereof will now be described, by way of example only, with reference to the accompanying drawings, of which:

Figure 3A:
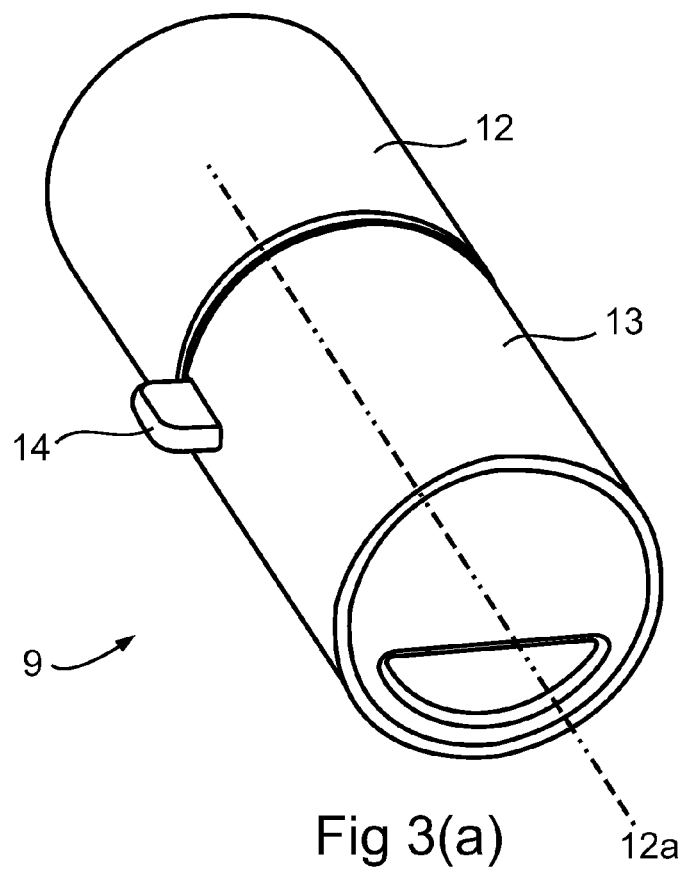
Figure 3B:
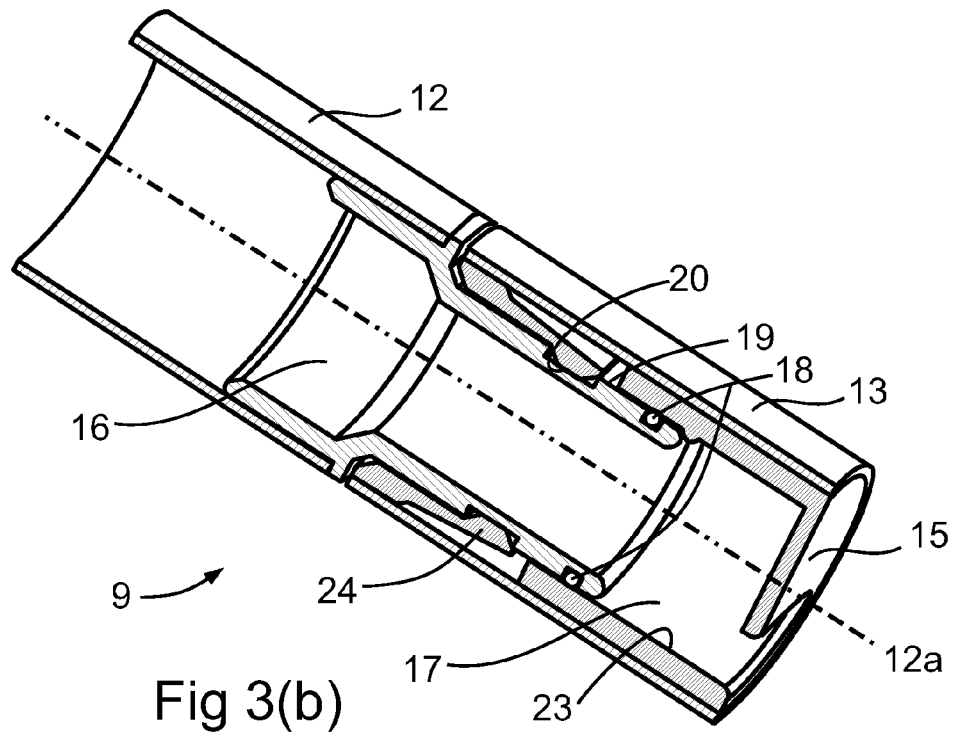
Figure 4A:
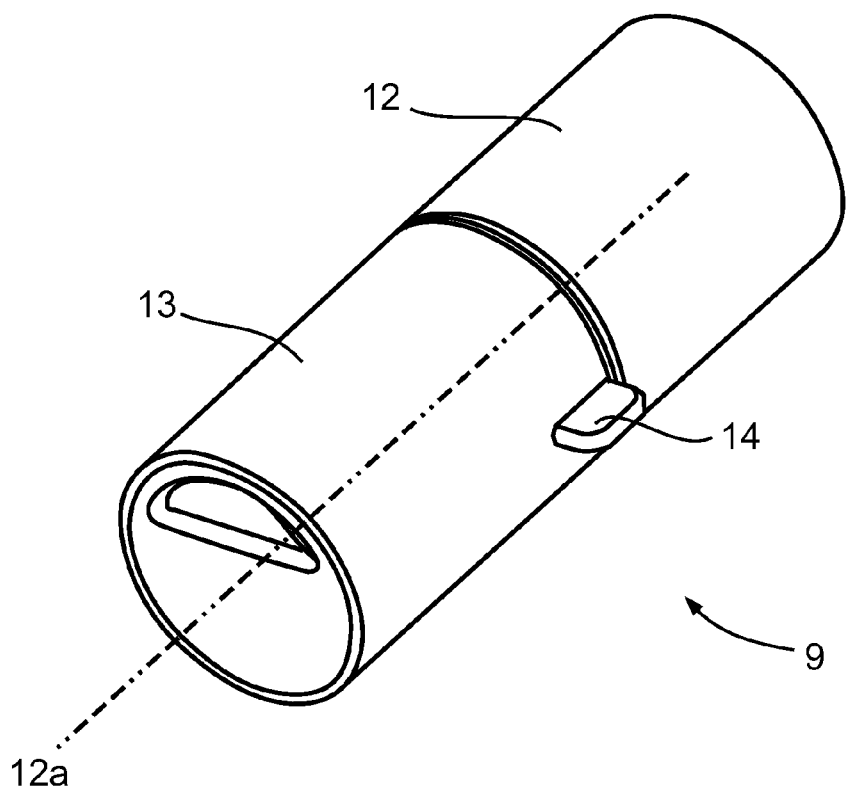
Figure 4B:
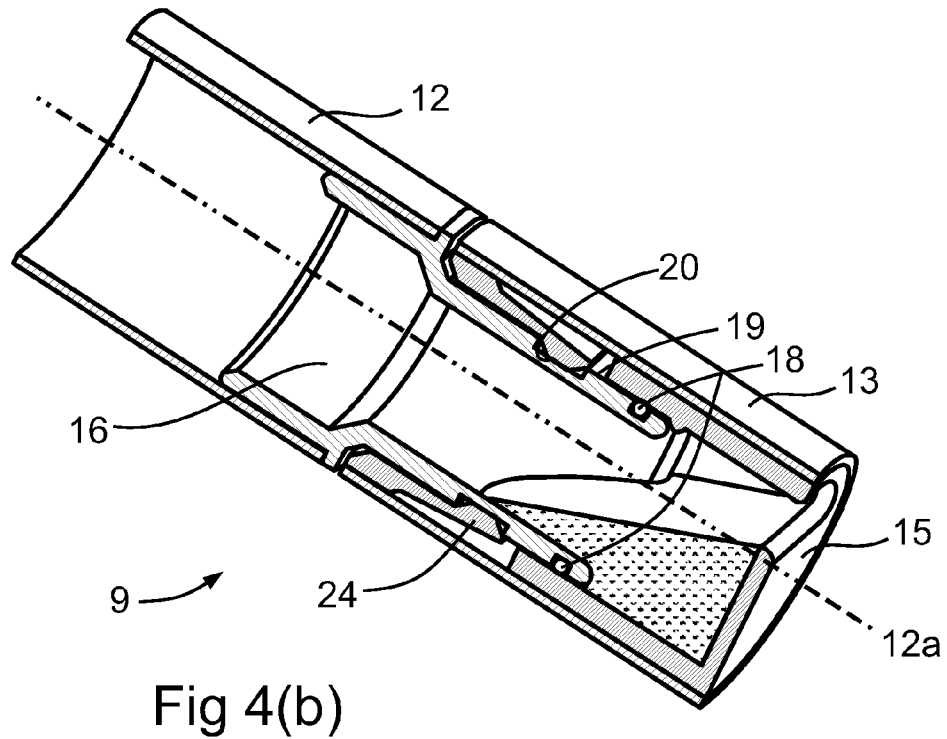
Figure 5A:
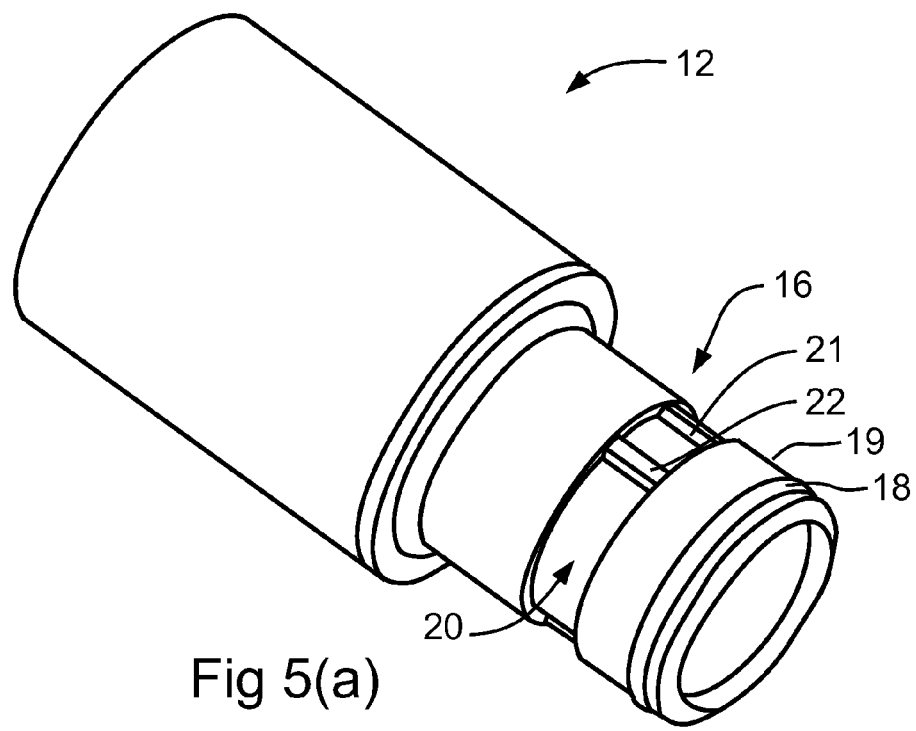
Figure 5B:
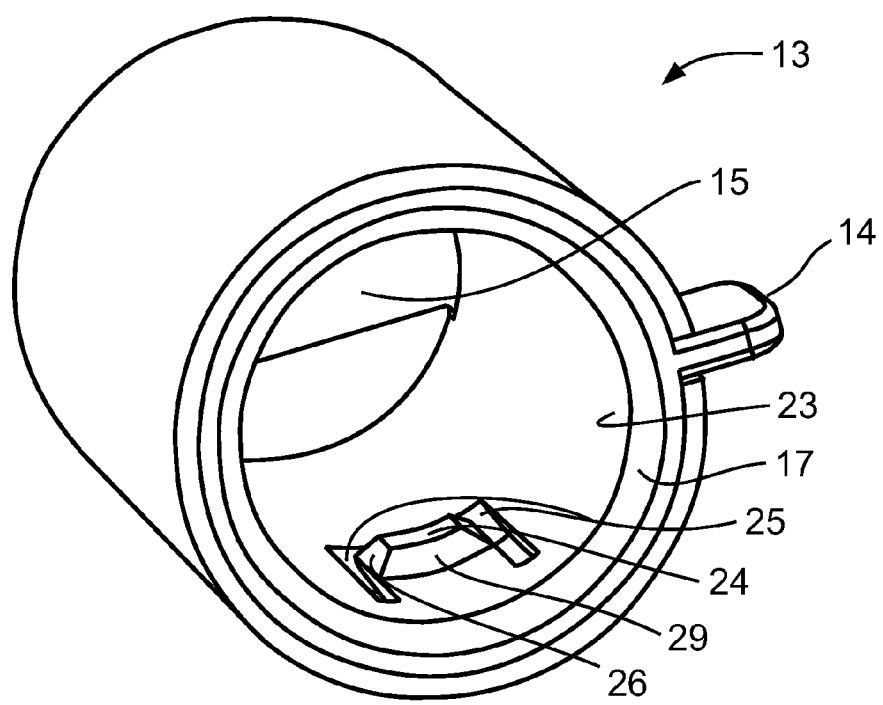

FIGS. 3(a) and 3(b) show respectively external and cross-sectional views of the outlet duct in a juice-delivering position;

FIGS. 4(a) and 4(b) show respectively external and cross-sectional views of the outlet duct in a drip-stopping position; and FIGS. 5(a) and 5(b) show respectively fixed and movable portions of the outlet duct, together with co-operable components formed therein to accommodate relative movement therebetween.

Figure 1A:
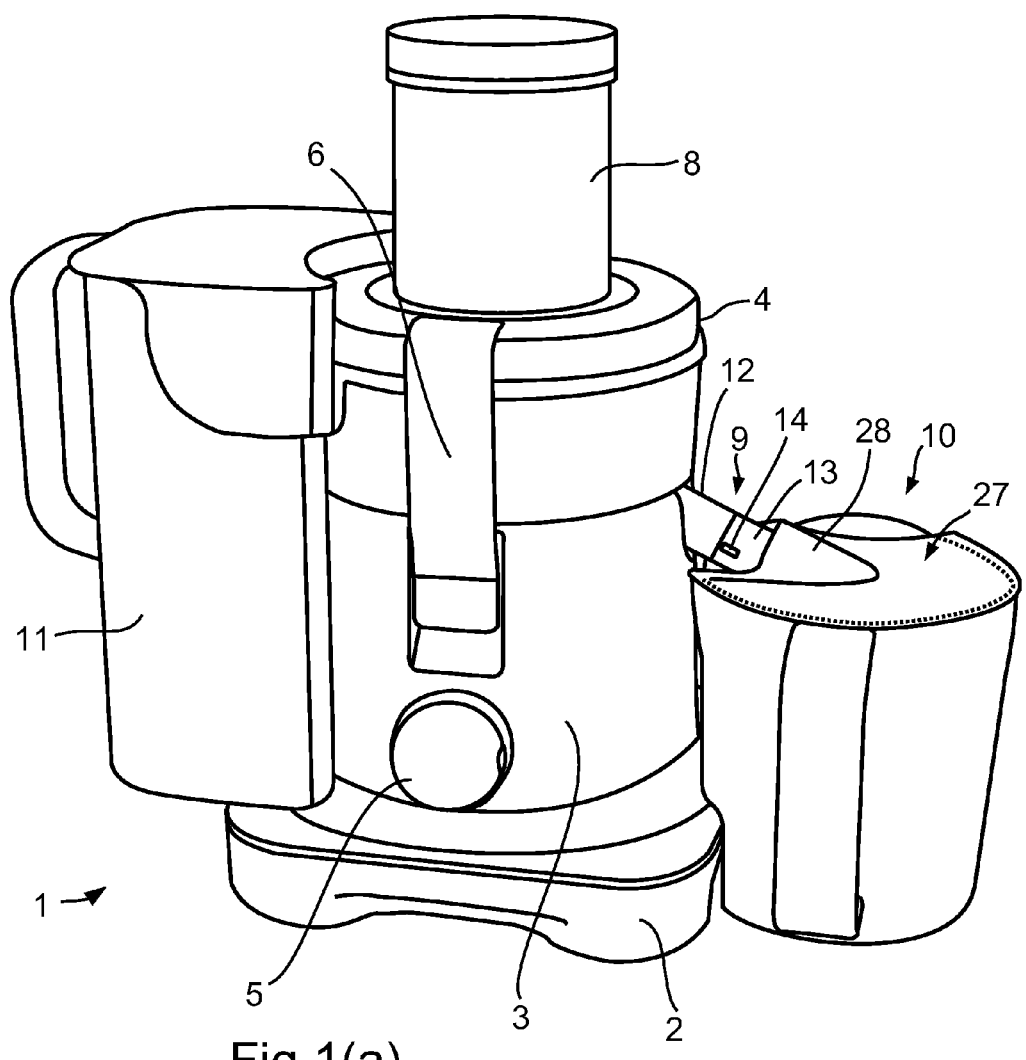
FIG. 1(a) shows, in general perspective view, the essential external components of a juicer arrangement in accordance with an embodiment of the invention, including the relevant parts of the main appliance, a vessel located to receive the juice and also a receptacle located to receive pulp residues.
Figure 1B:
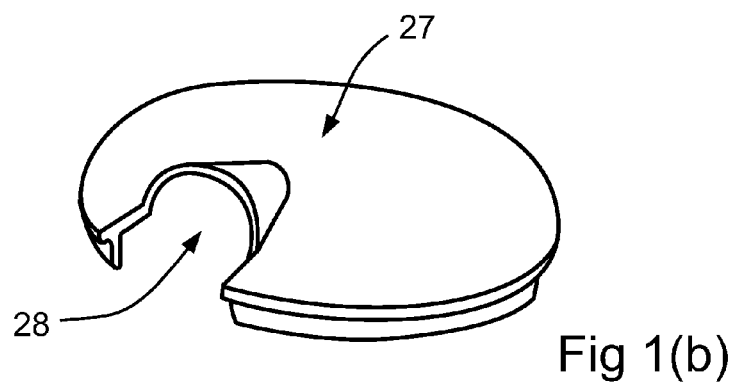
FIG. 1(b) shows a perspective view of a lid for the juice-receiving vessel.
Figure 2:
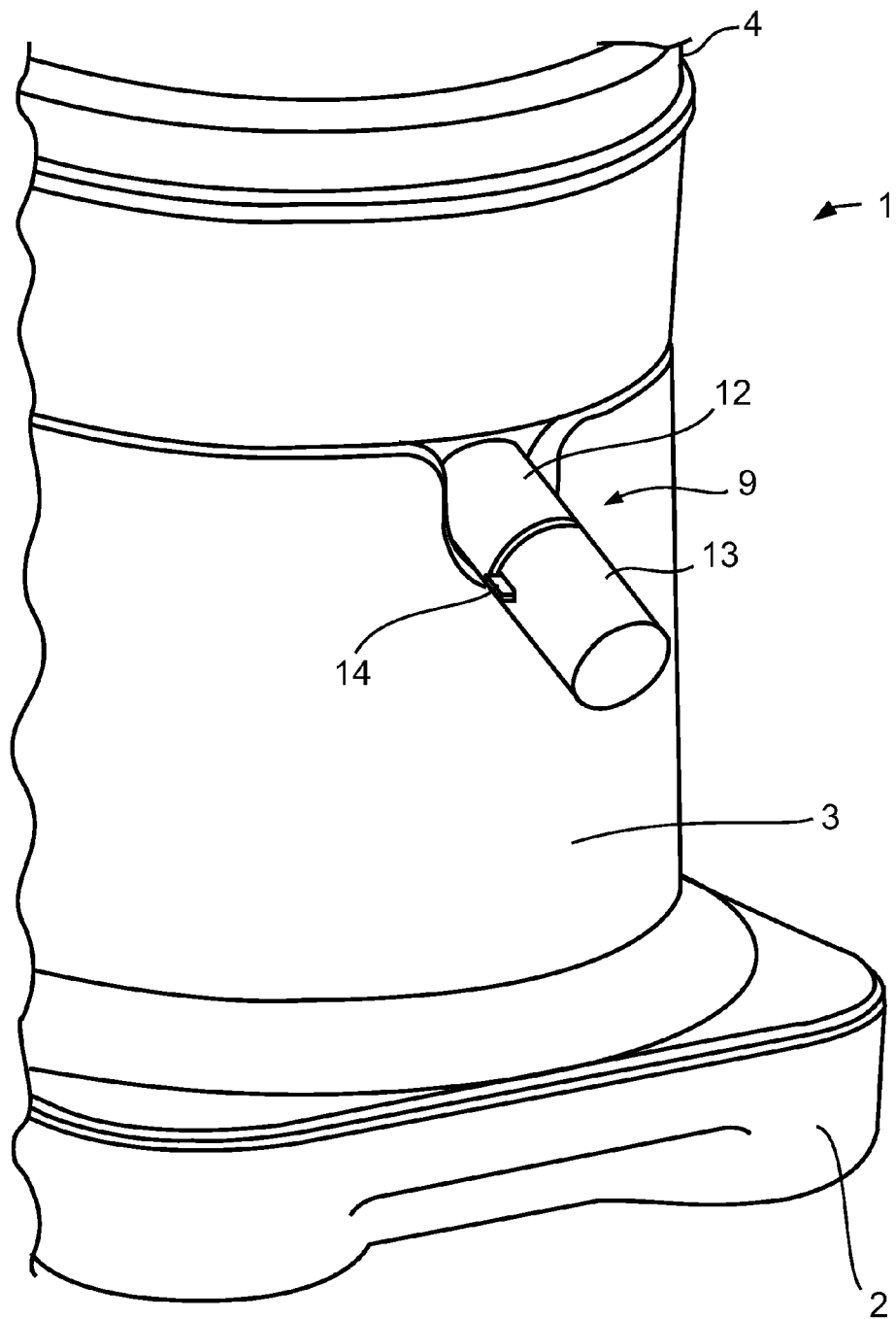
FIG. 2 shows a partial perspective view of the juicer and its outlet spout through which juice is intended to flow to the juice-receiving vessel.

Referring now to FIGS. 1(a), 1(b) and 2, the arrangement comprises a centrifugal juicer appliance 1 having a base 2, main body portion 3 and a lid 4. The main body portion 3 houses the electrical motor and the principal juicing components as already described, which can take any convenient form and are not material to the invention, so will not be further described herein. In this example, the main body portion carries a rotary switch 5, by means of which operation of the appliance 1 can be controlled, and a pair of latches such as 6 to securely hold the lid in place, though it will be appreciated that these components are shown by way of example only and could take other forms.

The lid 4 supports a feed-chute 8 dimensioned and configured to accommodate produce to be juiced, and a pusher (not shown) is provided whereby the produce can be urged through the feed-chute 8 and into abrasive contact with a cutter plate (not shown) which is provided within the main body portion 3, and which is rotated at high speed to create the juicing action of the appliance. As is well known, the feed-chute 8 and the appliance 1 in general have to be constructed so as to prevent, so far as is possible, the insertion of a user's fingers into contact with any component of the juicer that could cause injury. This is usually achieved partly by dimensional and ergonomic restraint and partly by means of electrical interlocks that prevent operation of the appliance 1 unless safe operating conditions are established. These essential conditions can, however, be met in any approved manner without departing from the scope of the present invention, which primarily concerns the nature of an outlet duct 9, extending from the main body portion 3, through which juice can be dispensed into a receiving vessel comprising a jug or carafe 10.

To complete the description of the external components of the appliance 1, there is also provided a separate container 11 positioned to receive the unwanted pulp residues which, as described previously, are a by-product of the juicing operation. Preferably, the container 11 is constructed and interacts with the main body portion 3 in the manner described in the aforementioned UK patent application, though other configurations can be used if desired.

In this example, the outlet duct 9 comprises a tubular inner portion 12, fixed to the main body 3 of the appliance 1 and having a longitudinal axis 12a; and a rotatable tubular end portion 13 disposed coaxially therewith. The end portion 13 can be rotated, relative to the fixed inner portion 12 and about the axis 12a, by user-manipulation of a tab or other member 14 formed on the external surface of the end portion 13.

As will now be described with reference to FIGS. 3(a), 3(b), 4(a), 4(b), 5(a) and 5(b), a principal feature of the outlet duct 9 is its ability to resist dripping of juice, once a desired amount of juice has been dispensed into the vessel 10. In this respect, and to address this problem, the rotatable end portion 13 of the duct 9 bears a transverse wall 15, which extends chordally across a circular outlet opening of the end portion 13 and is arranged (when the end portion 13 is appropriately orientated) to act as a dam as regards juice attempting to exit by way of the duct 9.

As mentioned previously, the end portion 13 of the duct 9 can rotate, relative to the fixed portion 12, about the axis 12a. The rotation preferably occurs through a predetermined angle (typically 180 degrees) and is limited by stops, as will be described later. When the end portion 13 of the outlet duct 9 is in a first (juice-delivery) position with respect to the fixed portion 12, as shown in FIGS. 3(a) and 3(b), the wall 15 is disposed upside-down, and thereby positioned so that juice can flow beneath the wall 15 and out of the duct 9.

When sufficient juice has been dispensed, and the appliance 1 has been switched off, the user manipulates the tab 14 to rotate the end portion 13 through the aforementioned predetermined angle (in this example 180 degrees) relative to the fixed portion 12 of the duct 9 to a second (non-drip) position, as shown in FIGS. 4(a) and 4(b); thereby positioning the wall to act as a dam to further outflow of juice; thus preventing drips when the juice-collecting vessel 10 is removed.

The fixed, inner portion 12 of the outlet duct 9 supports, in this example, a forward-protruding tubular insert 16 which is dimensioned to fit within a similar insert 17 carried by the end portion 13 of the outlet duct, and the inserts 16 and 17 bear respective co-operating components as will now be described. The inserts 16 and 17 may be made of food-grade plastics material, or they may be made of a suitable metal such as stainless steel. The two portions 12 and 13 of the duct 9 are preferably made of stainless steel.

The insert 16 carried by the inner, fixed portion 12 of the duct 9, supports a seal, in the form of an O-ring 18, and is formed on its external surface 19 with a circumferentially-extending slot 20 within which are disposed two pairs of ribs; one such pair of ribs being shown at 21 and 22 in FIG. 5(a). These pairs of ribs form respective end-stops, limiting the angular movement of the end portion 13 in both directions relative to the fixed portion 12 of the duct 9. The insert 17 overlies the O-ring 18 and is radially dimensioned to closely contact the O-ring 18 to form a seal which can accommodate the relative rotation between the two inserts and prevent unwanted egress of the juice between them.

The inwards-facing wall 23 of the insert 17 carried by the end portion 13 of the duct 9 is formed with a tongue member 24 which engages into the slot 20 to retain the end portion in place and is also used to provide a positive tactile indication when the end portion 13 has been rotated into one or the other of its extreme angular positions (juice-delivery and drip-stop respectively) relative to the fixed portion 12.

The tongue member 24 has a relatively complex shape, somewhat like a truncated pyramid, with inward-sloping walls such as 26 at either end and inwardly-sloping, circumferentially-extending walls, such as 29. Moreover, the tongue member 24 is surrounded on three sides by linked slots 25 formed through the insert 17, thereby providing a flexible mount for the tongue member. It will be appreciated that (as can best be seen in FIGS. 3(b) and 4(b), clearance is provided between the insert 17 and the inner wall of end portion 13 to allow sufficient flexure of the tongue member 24 for the above purpose.

When it is desired to assemble the end portion 13 to the fixed portion 12 of the duct 9, the end portion 13 is aligned with the fixed portion 12 and moved towards it, along axis 12a, causing the sloping face 29 of the tongue member 24 (assisted by the flexibility of its mounting) to ride over the surface 19 of the insert 16 until the tongue member 24 snaps into the slot 20.

When the end portion 13 is rotated relative to the fixed portion 12, the tongue member 24 runs around the slot 20 until it contacts one or other of the pairs of ribs (such as 21 and 22) located at either end of its travel, whereupon the sloping surface such as 26 of the tongue member 24 rides over the first rib of the pair and allows the tongue member 24 to snap into the recess between the two ribs. This action positively defines and limits the angular rotation of the end portion 13 relative to the fixed portion 12 and provides tactile assurance that the end portion is set to the desired angular position relative to the fixed portion 12.

In this example of the invention (as can best be seen in FIGS. 3(b) and 4(b)), a second tongue member, identical to the member 24, is provided on the inset 17, at a location diametrically opposite the tongue member 24, and both tongue members engage into slot 20 when the end portion 13 is assembled to the fixed portion 12 of the duct 9. This provides enhanced operation. Moreover, when the end portion 13 has been rotated into one or the other of its two stable end positions each tongue such as 24 is received within a respective one of the two recesses formed between the ribs (such as 21 and 22) of each pair of ribs located in the circumferential slot 20.

If desired, graphic indications can be provided on the external surface of the portion 12 or 13 of the duct 9 such that alignment of the tab 14 with one graphic indication or the other shows the user whether the outlet duct is in the juice-delivery or drip-stop position.

The end portion 13 is readily removable from the remainder of the outlet duct 9 for cleaning, by reversing the assembly procedure described above; i.e. by withdrawing it in the opposite axial direction to that used for assembly. The combination of a sloping surface (not shown), equivalent to surface 29, on the opposing face of the tongue member 24 and the flexibility of the tongue member's mounting to the insert 17 (and clearance between the insert 17 and end portion 13) provides the necessary movement to permit a user to readily dislodge the tongue member 24 from the slot 20.

The internal configuration of the end portion 13 is such as to promote ease of cleaning and reduce the likelihood of traps being provided for dirt and/or stale juice. Moreover, the wall 15 and the associated D-shaped opening in the end of portion 13 are configured such that, if the juicer should inadvertently be operated with the outlet duct set into its drip-stopping position, juice can not back up into the juicer. Instead, juice is allowed to overflow directly into the vessel 10. It is particularly advantageous that, by manipulation of the tab 14, the end portion 13 can be rotated between its juice delivery and drip-stop positions whilst remaining snugly inserted into a shrouded aperture 28 (see FIGS. 1(a) and 1(b)) provided in the lid or cover 27 of the juice-receiving vessel 10. Furthermore, it will be appreciated that, if desired, the juicer appliance 1 can be operated with the end portion 13 removed, thus foregoing the drip-stopping capability.

Proposals have previously been made, for example in EP-A1-1834555 and in WO-A2-2009/010897, to address the problem of dripping by means of a rotatable, elbow-like component. It will be appreciated that such proposals do not have the attributes discussed in the preceding paragraph.

Another problem addressed by the present arrangement, but not by the prior proposals mentioned above, is that of transferring juice cleanly into the vessel 10, without splashing. In this respect, the lid 27 of the vessel 10 is, in this example, formed (as mentioned above) with a shrouded inlet aperture 28 dimensioned to snugly accept an outer section of the end portion 13 of the outlet duct 9. The juice thus flows directly into the vessel 10 and moreover, as mentioned previously, the end portion 13 can be rotated between its juice-delivery and drip-stop positions whilst snugly inserted into the shrouded aperture 28, thereby providing clean transfer of juice whilst retaining the anti-drip capability.

In this embodiment of the invention, the axis 12a of the duct 9 is orientated at a downward angle to the horizontal sufficient to match the position of the shrouded aperture 28 in the lid 27 of the vessel 10. It will be understood, however, that the aforementioned downward angle could be adjusted in any given case to match a bespoke vessel such as 10 designed specifically for use with the appliance 1 and/or a standard glass or beaker, depending upon the set-up used in practice.

The invention claimed is:

1. A juicer arrangement comprising a motor-driven appliance capable of extracting juice from fruit and a vessel for receiving the juice; the appliance having an outlet duct for a flow path of the juice; said duct being tubular about an axis running there-along; the vessel having a lid or cover means pre-formed with an aperture dimensioned and configured to receive said tubular outlet duct, and the duct having an end portion with an internal wall extending chordally there-across, the internal wall including an opening; wherein at least said end portion is rotatable about the axis of the duct to invert said wall for juice dispensing and to otherwise position the opening in said internal wall from a drip position to an anti-drip position, a portion of the opening positioned in the flow path of the juice in the drip position thereby permitting juice dispensing, the opening rotated away from the flow path in the anti-drip position thereby permitting the internal wall to operate as an anti-dripping dam member to resist liquid flow.

2. The arrangement according to claim 1, wherein the end portion of the duct inserts at least part way into the aperture in said lid or cover means of said vessel, thereby assisting the clean delivery of juice into the vessel.

3. The arrangement according to claim 1, wherein the end portion of the duct is formed with a member that can be grasped, pressed or otherwise manipulated by a user to facilitate rotation of the end portion of the duct about said axis.

4. The arrangement according to claim 1, wherein the end portion can be rotated between the drip and anti-drip positions whilst remaining inserted into the aperture in said lid or cover means of said vessel.

5. The arrangement according to claim 1, wherein a liquid seal, configured to accommodate the rotation of said end portion of the duct relative to a fixed, inner portion of the duct, is provided between an external surface of an insert supported by the inner portion and an internal surface of an insert carried by the end portion.

6. The arrangement according to claim 1, wherein the inner portion of the outlet duct comprises a fixed, substantially straight and hollow tube and said end portion comprises an outer collar that can rotate through at least a predetermined angle relative to the tube.

7. The arrangement according to claim 6, wherein the fixed tube and the end portion are formed with co-operative components limiting and defining the angle through which the end portion of the duct may rotate relative to the fixed tube.

8. The arrangement according to claim 6, wherein the fixed tube and the end portion are formed with co-operative components permitting their axial assembly and disassembly, whereby the end portion is readily removable for cleaning.

9. The arrangement according to claim 1, wherein the axis of the tubular outlet duct is angled downwards from the appliance.

10. The arrangement according to claim 1, wherein the aperture in the lid or cover means of the juice-receiving vessel comprises an aperture dimensioned to snugly receive part at least of the end portion of the outlet duct.

11. The arrangement according to claim 1, wherein the vessel and the appliance are designed to present complementary or contrasting appearances, and are shaped so as to inter-fit with one another.

12. The arrangement according to claim 1, wherein an inner side of the end portion is slidable over at least part of an outer side of the fixed tube in order to connect the end portion with the fixed tube.

13. A juicer arrangement comprising a motor-driven appliance capable of extracting juice from fruit and a vessel for receiving the juice, the appliance having an outlet duct for the juice, said duct being tubular about an axis running there-along, the vessel having a lid or cover means pre-formed with an aperture dimensioned and configured to receive said tubular outlet duct, and the duct having an end portion with an internal wall extending chordally there-across;
   wherein the inner portion of the outlet duct comprises a fixed, substantially straight and hollow tube and said end portion comprises an outer collar that can rotate through at least a predetermined angle relative to the tube;
   wherein the fixed tube and the end portion are formed with co-operative components limiting and defining the angle through which the end portion of the duct may rotate relative to the fixed tube;
   wherein at least said end portion is rotatable about the axis of the duct to invert said wall for juice dispensing and to otherwise position said wall as an anti-dripping dam member to resist liquid flow; and
   wherein end stops are provided for the angular movement of the end portion, whereby a user is provided with tactile confirmation that the end portion is properly located in one or other of its extreme angular positions relative to the fixed portion of the outlet tube, either for dispensing or to resist dripping.

14. The arrangement according to claim 13, wherein the fixed tube and the end portion are formed with co-operative components.

15. The arrangement according to claim 13, wherein a liquid seal, configured to accommodate the rotation of said end portion of the duct relative to a fixed, inner portion of the duct, is provided between an external surface of an insert supported by the inner portion and an internal surface of an insert carried by the end portion.

16. A juicer arrangement comprising:
   a motor-driven appliance operable to extract juice from fruit; and
   a tubular outlet duct for draining the extracted juice from the appliance to a vessel for receiving the juice, the draining juice flowing along a juice flow path on an inner side of the outlet duct, the outlet duct projecting away from an outlet aperture in the appliance along an outlet axis, the outlet duct including
      an upper portion in fixed communication with the aperture of the appliance, and
      an end portion connectable with the upper portion and rotatable about the outlet axis with respect to the upper portion between a drip position and an anti-drip position, the end portion including an internal wall extending across the inner side of the end portion of the outlet duct and having an aperture, at least a portion of the aperture positioned in the juice flow path in the drip position and the aperture rotated away from the juice flow path in the anti-drip position, the internal wall operating as an anti-dripping dam member in the anti-drip position, the aperture open in both the drip and anti-drip positions so as to permit a fluid not in the juice flow path to flow through the aperture in the anti-drip position.

17. The juicer arrangement according to claim 16, the inner side of the end portion slidable over at least part of an outer side of the upper portion in order to connect the upper and end portions.

18. The juicer arrangement according to claim 16, the upper portion including a slot extending circumferentially about an external surface of the upper portion, and the lower portion including a tongue member projecting from the internal wall of the lower portion, the tongue member engagable with and slidable along the slot.

19. The juice arrangement according to claim 18, the slot having a pair of ribs within the slot in order to block the tongue member from sliding along the slot thereby restricting rotation of the lower portion with respect to the upper portion.

20. The juice arrangement according to claim 16, the outlet duct projects away from the outlet aperture in the appliance at a downward incline along the outlet axis.

\* \* \* \* \*